A. SHAW.
Claw-Bar.
No. 166,818. Patented Aug. 17, 1875.
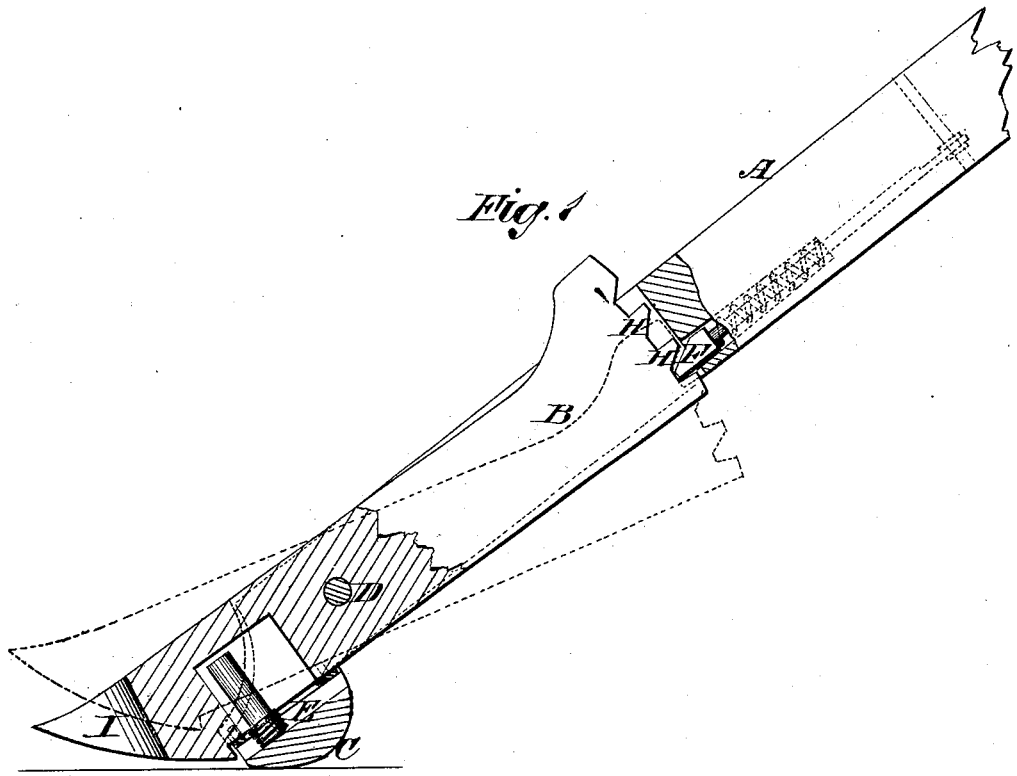
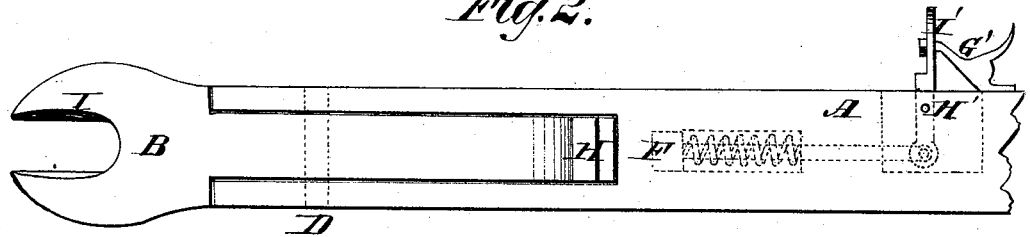
WITNESSES:
Francis McArdle
H. F. Terry
INVENTOR:
A. Shaw
BY
ATTORNEYS.

UNITED STATES PATENT OFFICE.

ANDREW SHAW, OF PETROLEUM, WEST VIRGINIA.

IMPROVEMENT IN CLAW-BARS.

Specification forming part of Letters Patent No. 166,818, dated August 17, 1875; application filed June 26, 1875.

*To all whom it may concern:*

Be it known that I, ANDREW SHAW, of Petroleum, in the county of Ritchie and State of West Virginia, have invented a new and useful Improvement in Claw-Bars, of which the following is a specification:

The object of this invention is to provide a bar for drawing spikes from railroad-ties, and for drawing spikes or nails in other places, that will allow the clutch-jaw to be raised and the leverage obtained, diminished after the spike has been partly drawn, so as to draw the spike clear out.

In the accompanying drawing, Figure 1 is a sectional side view of the draw-bar. Fig. 2 is a top view.

Similar letters of reference indicate corresponding parts.

This bar is made in two main parts, the lever and the clutch-bar. A is the lever, and B is the clutch-bar. The lever A is slotted, and the shank of the clutch-bar is let into the slot, as seen in Fig. 2, and fitted to the head of the lever. C is the fulcrum of the draw-bar, being a portion of the lever A. The two parts are confined together by the pin D. E is a spring in a recess opposite the fulcrum C, to throw the clutch up. F is a spring-bolt, which is operated by means of a lever and trigger in the lever. In the end of the shank of the clutch are a series of teeth, H, which the spring-bolt F enters, and by which the shank is fastened downward, as represented in dotted lines, which throw the clutch end I upward. The clutch-bar B turns on the pin D in this case, and the pin D becomes the fulcrum of the clutch. When in use the draw-bar is applied as seen in Fig. 1, the clutch-bar being locked by the spring-bolt F in a position parallel with the lever A. In this position of the bar the spike is started and drawn partly out, but it cannot be drawn clear out, as the leverage from the fulcrum C to the clutch is too short, consequently the position of the clutch-bar B is altered to the position seen in dotted lines, the clutch being raised from the head of the lever so that the pin D takes the strain or resistance while C remains the fulcrum of the lever. The spring-bolt is pressed constantly downward, and drawn back by the spring. I is the lever, whose fulcrum is at H'. G' is a trigger for operating the lever.

In drawing a spike the main force must be exerted on the starting of the spike when the draw-bar is in the first position. When the clutch-bar is changed the strain required is much less on the clutch-bar, and, consequently, the fulcrum-pin D is sufficient for the purpose.

Having thus described my invention, I claim as new and desire to secure by Letters Patent—

The combination, with the lever A and clutch-bar B, having teeth H, of the spring trip-bolt F, substantially as shown and described.

ANDREW SHAW.

Witnesses:
 G. W. GENDLEY,
 JNO. W. CHISHOLM.